US012795281B2

(12) United States Patent
Liu et al.

(10) Patent No.: US 12,795,281 B2
(45) Date of Patent: Nov. 10, 2026

(54) EARPHONE

(71) Applicant: Merry Electronics(Shenzhen) Co., Ltd., ShenZhen (CN)

(72) Inventors: Chih-Hung Liu, Taichung (TW); Chun-Hung Chang, Taichung (TW); Hung-Wei Chen, Taichung (TW); Cheng Yu Tsai, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 146 days.

(21) Appl. No.: 19/044,641

(22) Filed: Feb. 4, 2025

(65) Prior Publication Data

US 2026/0189838 A1 Jul. 2, 2026

(30) Foreign Application Priority Data

Dec. 27, 2024 (TW) ................................ 113151076

(51) Int. Cl.
*H04R 25/02* (2006.01)
*H04R 1/10* (2006.01)

(52) U.S. Cl.
CPC ................................ *H04R 1/1016* (2013.01)

(58) Field of Classification Search
CPC ........ H04R 1/10; H04R 1/1016; H04R 1/105; H04R 1/1066; H04R 1/1075; H04R 25/02; H04R 25/607; H04R 2201/10; H04R 2225/025
See application file for complete search history.

(56) References Cited

U.S. PATENT DOCUMENTS

| | | | | |
|---|---|---|---|---|
| 7,349,550 B2 * | 3/2008 | Oliveira | H04R 1/10 381/374 |
| 9,462,366 B2 * | 10/2016 | Silvestri | H04R 1/1083 |
| 10,587,947 B2 * | 3/2020 | Kelley | H04R 1/105 |
| 10,986,432 B2 * | 4/2021 | Paetsch | H04R 1/1058 |
| 2003/0174853 A1 * | 9/2003 | Howes | H04R 1/105 381/376 |
| 2004/0096075 A1 * | 5/2004 | Kuhlmann | H04R 1/1016 381/328 |
| 2014/0286515 A1 * | 9/2014 | Bone | H04R 1/1016 381/328 |
| 2015/0201269 A1 * | 7/2015 | Dahl | H04R 25/656 381/74 |

(Continued)

*Primary Examiner* — Ryan Robinson
(74) *Attorney, Agent, or Firm* — JCIPRNET

(57) ABSTRACT

An earphone adapted to be worn on an ear is provided. The earphone includes a wearing component and an acoustical component. The wearing component includes a front positioning structure and an acoustic channel, and the acoustic channel is located in the front positioning structure. The acoustical component is connected to the wearing component, and the acoustical component includes an acoustic chamber, and the acoustic chamber is connected to the acoustic channel. When the earphone is worn on the ear, the wearing component is located in a cavum conchae of the ear, a surface of the earphone adjacent to a bottom of the concha cavity is located on a datum plane, and the acoustical component and the front positioning structure are located on a first side of the datum plane. The bottom of the concha cavity is located on a second side of the base plane.

10 Claims, 4 Drawing Sheets

(56) References Cited

U.S. PATENT DOCUMENTS

| | | | | |
|---|---|---|---|---|
| 2016/0073192 | A1* | 3/2016 | Briggs | H04R 1/105 381/380 |
| 2018/0213315 | A1* | 7/2018 | Kirkpatrick | A61F 11/12 |
| 2020/0016006 | A1* | 1/2020 | Van Den Hout | H04R 1/1058 |
| 2022/0312100 | A1* | 9/2022 | Lee | H04R 1/1016 |
| 2025/0056143 | A1* | 2/2025 | Zhang | H04R 1/023 |
| 2025/0358561 | A1* | 11/2025 | Smith | H04R 1/1016 |

* cited by examiner

EARPHONE

CROSS-REFERENCE TO RELATED APPLICATION

This application claims the priority benefit of Taiwan application serial no. 113151076, filed on Dec. 27, 2024. The entirety of the above-mentioned patent application is hereby incorporated by reference herein and made a part of this specification.

BACKGROUND

Technical Field

The disclosure relates to an earphone.

Description of Related Art

The modern earphones include a sound output structure, an acoustical component, and an acoustic chamber. An acoustical component is disposed in the acoustic chamber, and the acoustic chamber is located inside or beside the sound output structure. When the earphone is worn on the ear, the sound output structure extends into the ear to output the audio to the ear canal of the ear. Due to the way the earphone worn on the ear, in order to ensure the wearing comfort of the earphone, the size of the acoustic chamber is relatively small, resulting in poor audio experience and poor audio performance of the earphone. Moreover, the connection stability between the earphone and the ear is poor, and the earphone may easily fall off from the ear due to the accidental touch or the unexpected force.

SUMMARY

The disclosure provides an earphone with improved the wearing stability, the audio experience, and the audio performance.

The earphone of the disclosure is adapted to be worn on an ear. The earphone includes a wearing component and an acoustical component. The wearing component includes a front positioning structure and an acoustic channel. The acoustic channel is located in the front positioning structure. The acoustical component is connected to the wearing component, and the acoustical component includes an acoustic chamber, and the acoustic chamber is communicated with the acoustic channel. When the earphone is worn on the ear, the wearing component is located in a cavum conchae of the ear, a surface of a bottom of the earphone near the cavum conchae is located on a datum plane, the acoustical component and the front positioning structure are located on a first side of the datum plane, the bottom is located on a second side of the datum plane, and the first side is opposite to the second side. The front positioning structure abuts against the ear.

Based on the above, when the earphone of the disclosure is worn on the ear, the wearing component of the earphone is located in the cavum conchae and the front positioning structure of the wearing component abuts against the ear. The earphone is stably connected to the ear through the front positioning structure of the wearing component, improving the wearing stability of the earphone. The acoustical component and the front positioning structure of the earphone are located on the same side of the datum plane, and the bottom of the cavum conchae of the ear is located on the other side of the datum plane. The size of the acoustical component of the earphone is not limited by the ear, and the larger acoustical component (the acoustic chamber) can be provided to improve the audio experience and the audio performance of the earphone.

DESCRIPTION OF THE EMBODIMENTS

Figure 1:
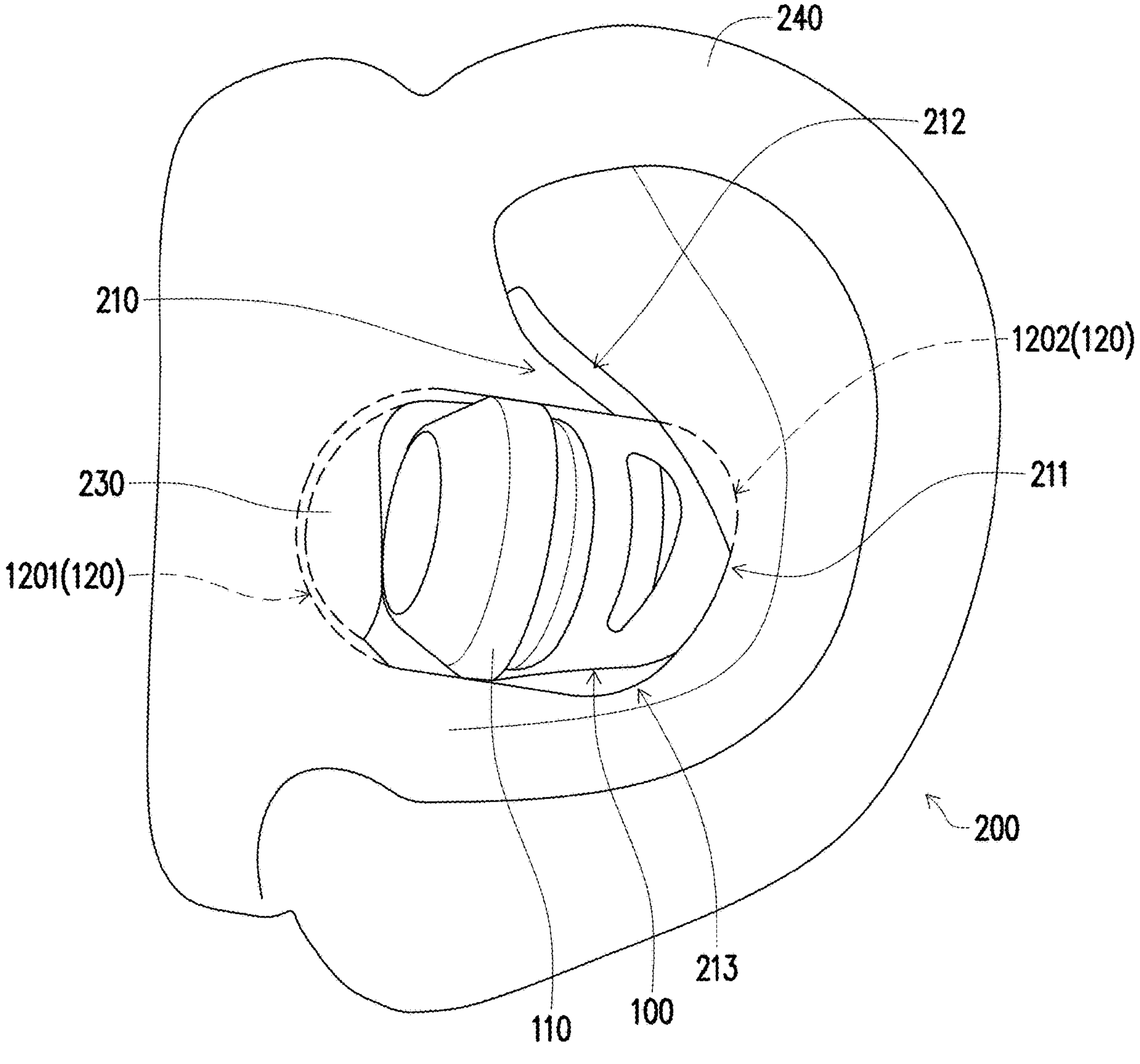
FIG. 1 is a schematic view of an earphone according to an embodiment of the disclosure worn on an ear.
Figure 2:
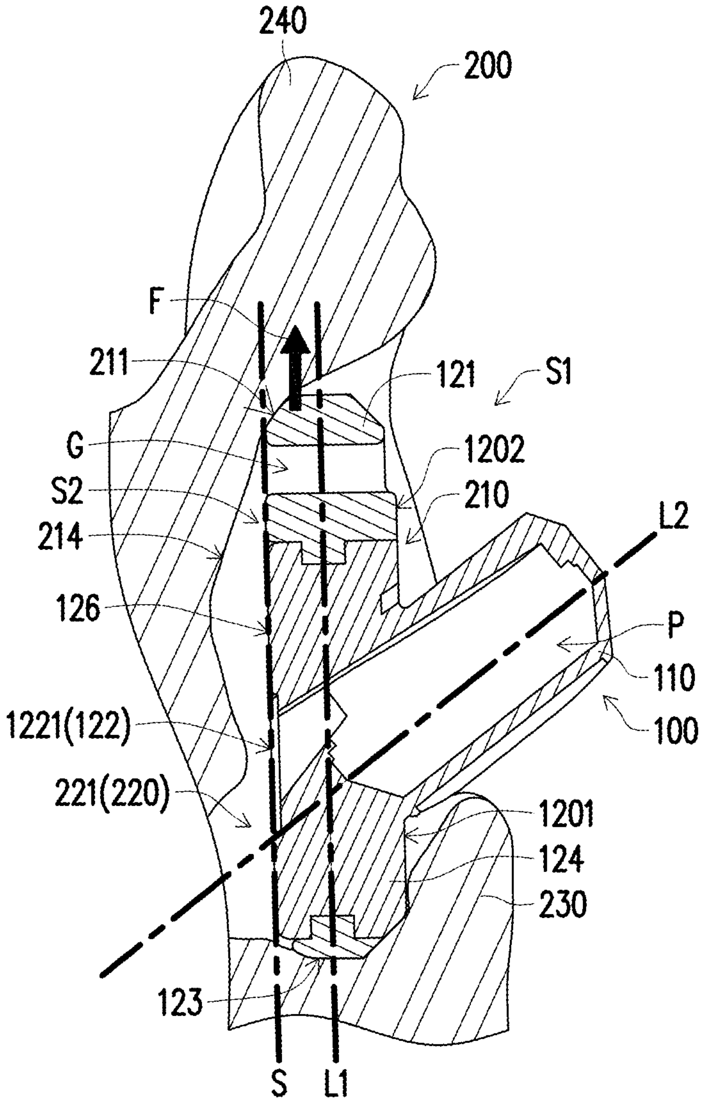
FIG. 2 is a cross-sectional view of the earphone of FIG. 1 worn on the ear.
Figure 3:
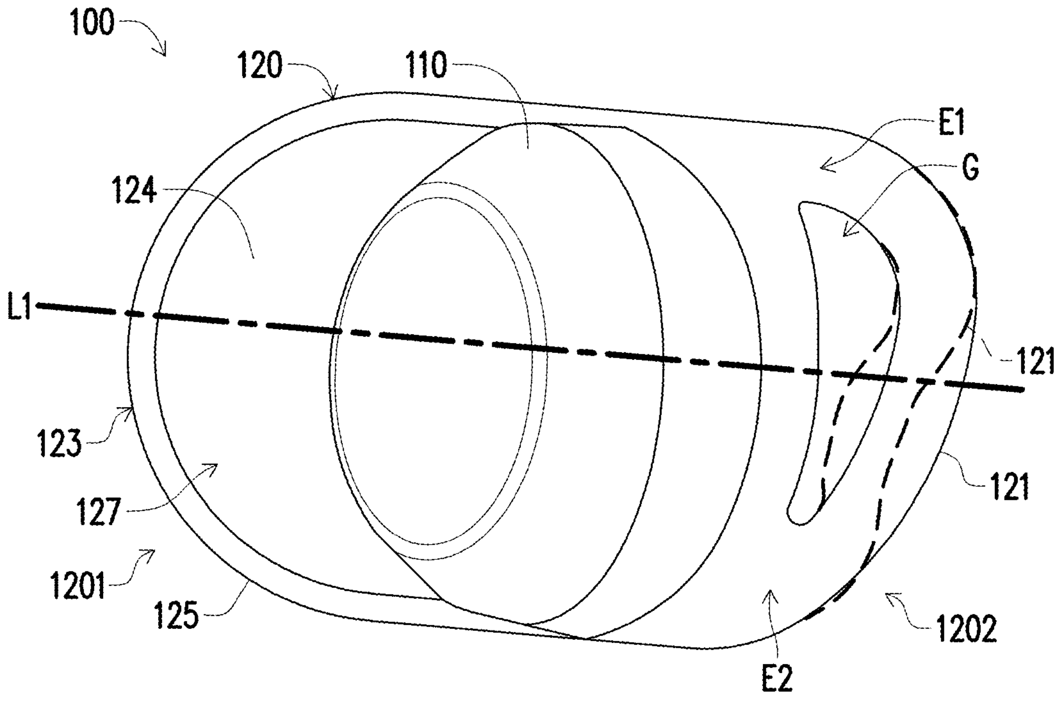
FIG. 3 is a schematic view of the earphone of FIG. 1.
Figure 4:
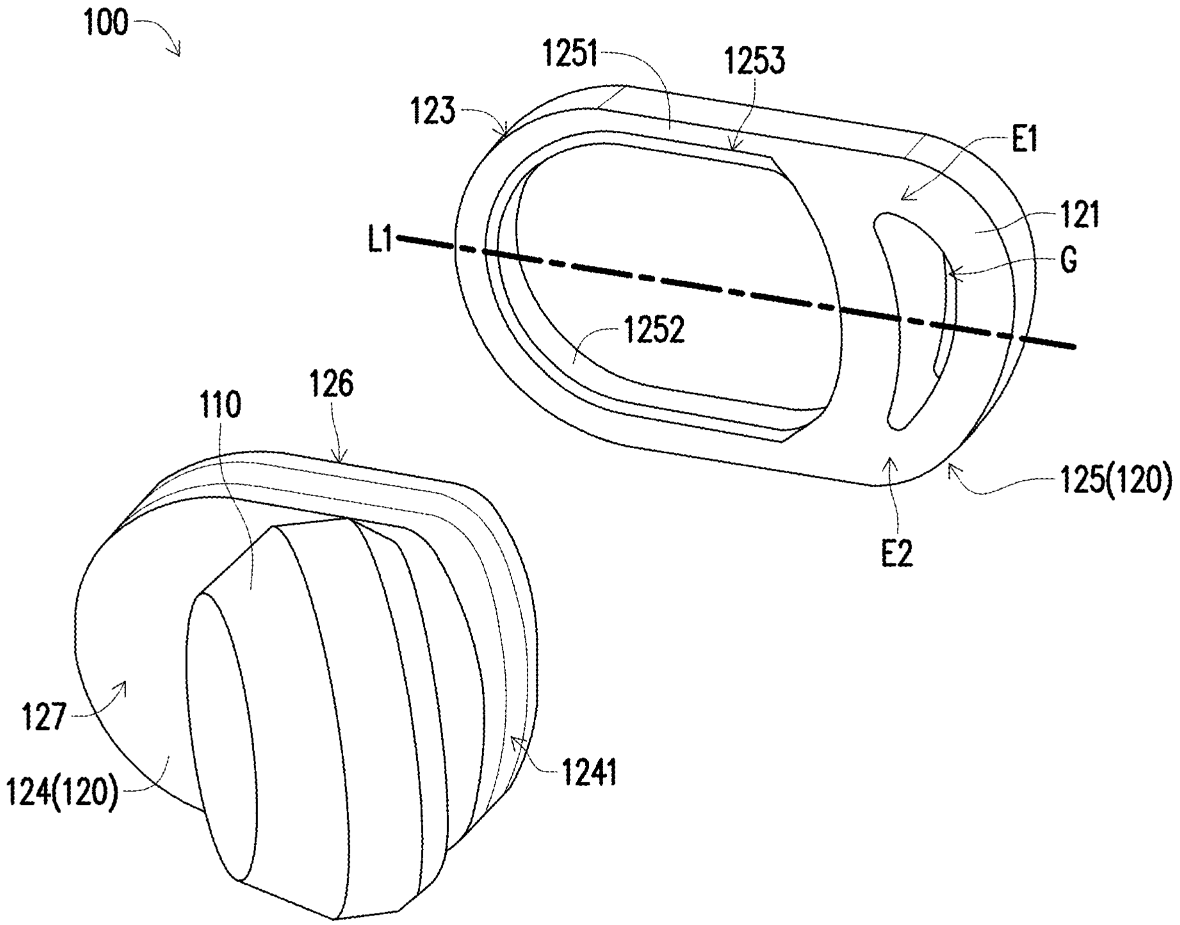
FIG. 4 is an exploded view of the earphone of FIG. 3.

FIG. 1 is a schematic view of an earphone according to an embodiment of the disclosure worn on an ear. FIG. 2 is a cross-sectional view of the earphone of FIG. 1 worn on the ear. FIG. 3 is a schematic view of the earphone of FIG. 1. FIG. 4 is an exploded view of the earphone of FIG. 3. Please refer to FIG. 1 to FIG. 4 at the same time, the earphone 100 may be worn on an ear 200. The earphone 100 includes an acoustical component 110 and a wearing component 120. The acoustical component 110 is connected to the wearing component 120. The acoustical component 110 includes an acoustic chamber P, and the wearing component 120 includes a front positioning structure 1201 and an acoustic channel 122. The acoustic channel 122 is located in the front positioning structure 1201 and communicated with the acoustic chamber P. The front positioning structure 1201 is communicated with the acoustic chamber P through the acoustic channel 122. A plurality of acoustic components and a plurality of electronic components (not shown) may be disposed in the acoustic chamber P.

The cavum conchae 210 of the ear 200 includes a cymba conchae 212, a rear edge 211, a bottom edge 213, and a bottom 214. The rear edge 211 connects between the cymba conchae 212 and the bottom edge 213, and faces a tragus 230 of the ear 200. The cymba conchae 212, the rear edge 211, and the bottom edge 213 surround the bottom 214. The tragus 230 covers an ear canal inlet 221 of an ear canal 220 of the ear 200. The bottom 214 connects to the ear canal 220 of the ear 200. When the earphone 100 is worn on the ear 200, the wearing component 120 is located in the cavum conchae 210 of the ear 200. The surface of the earphone 100 approaching the bottom 214 of the cavum conchae 210 is located on a datum plane S. The datum plane S is a virtual plane.

The acoustical component 110, the wearing component 120 (the front positioning structure 1201), and the tragus 230 of the ear 200 are located on a first side S1 of the datum plane S. The bottom 214 of the cavum conchae 210 and the ear canal 220 are located on a second side S2 of the datum plane S. The first side S1 is opposite to the second side S2. The front positioning structure 1201 includes a front positioning portion 123. The front positioning portion 123 of the front positioning structure 1201 extends into the cavum conchae 210 to lean against the ear 200, causing at least a part of the front positioning structure 1201 (i.e., the front positioning portion 123) to be covered by the tragus 230 of the ear 200, thereby preventing the earphone 100 from leaving the ear 200 due to the accidental touch or the unexpected force. The earphone 100 is stably worn on the ear 200, thereby improving the wearing stability of the earphone 100. The acoustic chamber P of the acoustical component 110 is separated from the front positioning portion 123 of the front positioning structure 1201, ensuring that the structure of the front positioning structure 1201 (the front positioning portion 123) is not affected by the acoustical component 110.

The known earphone includes a sound output structure, an acoustic component and an acoustic chamber disposed within or beside the sound output structure. When the know earphone is worn on the ear 200, the sound output structure of the known earphone extends into the cavum conchae of the ear 200 to connect the earphone to the ear 200. As the acoustic component and acoustic chamber are disposed in the sound output structure, in order to avoid affecting the wearing experience, the volume of the acoustic component and acoustic chamber of the known earphone is limited and relatively small, resulting in poorer audio experience and poorer audio performance of the earphone. Moreover, the known earphones need to dispose the additional structure such as the ear hook or the ear clip to engage with the helix 240 of the ear 200, further increasing the volume of the earphone.

In this embodiment, when the earphone 100 is worn on the ear 200, the entire earphone 100 is located on the first side S1 of the datum plane S, and the acoustical component 110 is separated from the front positioning portion 123 of the front positioning structure 1201, therefore, the acoustical component 110 of the earphone 100 does not affect the connection between the earphone 100 (the front positioning portion 123) and the ear 200. In other words, the size of the acoustical component 110 of the earphone 100 is not limited by the structure of the front positioning structure 1201 (the front positioning portion 123), and may have the larger acoustic chamber P. For example, the diameter of the acoustical component 110 in this embodiment may be greater than 13 millimeters, resulting in the larger acoustic chamber P, which provides the earphone 100 with better audio experience and better audio performance. The diameter of the acoustical component 110 is preferably 13.6 millimeters, but not limited thereto. Thereby, the earphone 100 of this embodiment improves the volume of the acoustical component 110 (the acoustic chamber P) while maintaining the better wearing comfort and the better wearing stability, thus improving the audio experience and audio performance of the earphone 100.

As shown in FIG. 2 to FIG. 4, the wearing component 120 includes a sound output surface 126, and an acoustic sound output hole 1221 of the acoustic channel 122 is located on the sound output surface 126. The sound output surface 126 of this embodiment is located on the datum plane S, and the datum plane S (the sound output surface 126) is a flat surface, but not limited thereto. In an embodiment not shown, the datum plane S may be a curved surface. When the earphone 100 is worn on the ear 200, since the front positioning structure 1201 of the wearing component 120 extends into the cavum conchae 210 of the ear 200 and the acoustic chamber P is connected to the front positioning structure 1201, the sound output surface 126 of the earphone 100 faces the ear canal 220 of the ear 200, making the acoustic channel 122 correspond to the ear canal 220, and closer to the ear canal inlet 221 of the ear canal 220, thereby shortening the distance between the acoustic channel 122 and the ear canal 220. When the earphone 100 outputs audio to the ear 200, the acoustic chamber P directly outputs sound to the ear canal 220 through the acoustic channel 122 (the front positioning structure 1201), so as to reduce the degree of the signal energy attenuation of the audio entering the ear canal 220 from the earphone 100 and improve the audio experience and the audio performance of the earphone 100.

The wearing component 120 further includes a rear positioning structure 1202, and the rear positioning structure 1202 includes a rear positioning portion 121. The front positioning structure 1201 and the rear positioning structure 1202 are located on an extension axis L1 of the wearing component 120, but not limited thereto. When the earphone 100 is worn on the ear 200, the rear positioning structure 1202 is located on the first side S1 of the datum plane S, and the rear positioning portion 121 of the rear positioning structure 1202 abuts against the rear edge 211 of the cavum conchae 210. The extension axis L1 of the wearing component 120 is parallel to the datum plane S (the sound output surface 126), but not limited thereto. Thereby, the wearing component 120 of this embodiment is more stably connected to the ear 200 and has a smaller volume for easy storage and wearing. The rear positioning portion 121 abuts against the cavum conchae 210 in a direction parallel to the extension axis L1, but not limited thereto.

As shown in FIG. 3 and FIG. 4, the wearing component 120 specifically includes a wearing body 124 and a support component 125 connected to each other. The acoustical component 110 is connected to a surface 127 of the wearing body 124 opposite to the sound output surface 126, and the acoustic channel 122 is located in the wearing body 124. A portion of the support component 125 and the wearing body 124 jointly form the front positioning structure 1201, and another portion of the support component 125 and the wearing body 124 jointly form the rear positioning structure 1202. The wearing body 124 includes a slot 1241, and the support component 125 includes a support body 1251. The support body 1251 includes a connecting opening 1253 and a protrusion 1252. The protrusion 1252 extends from the edge of the connecting opening 1253 towards the center of the support body 1251. The wearing body 124 may enter the connecting opening 1253, causing the protrusion 1252 to engage with the slot 1241, thereby connecting the support component 125 (the support body 1251) to the wearing body 124.

The front positioning portion 123 is located on one side of the support body 1251 and has an arc shape, but not limited thereto. Two ends E1, E2 of the rear positioning portion 121 are connected to the other side of the support body 1251, forming a hollow structure G between the rear positioning portion 121 and the support body 1251. The material of the support component 125 of this embodiment is a soft material, and the support body 1251 and the rear positioning portion 121 are integrally formed, but not limited thereto. In an embodiment not shown, the material of the support component 125 may be a non-soft material.

FIG. 3 shows the deformed rear positioning portion 121 of the rear positioning structure 1202 with the dashed line. As shown in FIG. 2 and FIG. 3, when the earphone 100 is worn on the ear 200, the rear positioning portion 121 of the rear positioning structure 1202 is pressed and deformed by the cavum conchae 210 to generate a positioning force F, causing the earphone 100 to actively abut against the rear edge 211 of the cavum conchae 210. The earphone 100 is adapted to the ear 200 with different shape through the deformation of the rear positioning portion 121, thereby improving the usability of the earphone 100 and enhancing the connection strength between the earphone 100 and the ear 200. The positioning force F may specifically be a frictional force or a deformation force, but not limited thereto.

The structure and the material of the support component 125 are not limited to this embodiment. In an embodiment not shown, there may not be the hollow structure G between the rear positioning portion 121 and the support body 1251, yet the rear positioning portion 121 may still deform to provide the positioning force F. In an embodiment not shown, the front positioning portion 123 may have the same structure as the rear positioning portion 121. An extension axis L2 of the acoustical component 110 of this embodiment is different from an extension axis L1 of the wearing component 120, so that the acoustical component 110 is inclinedly connected to the wearing component 120, but not limited thereto. The earphone 100 is a wireless earphone, but not limited thereto. The earphone 100 of this embodiment is an open-type earphone, but not limited thereto. The earphone 100 may include an atmosphere sound channel (not shown) to transmit the environmental sound into the ear 200.

In summary, when the earphone of the disclosure is worn on the ear, the wearing component of the earphone is located in the cavum conchae and the front positioning structure of the wearing component abuts against the ear. The earphone is stably connected to the ear through the front positioning structure of the wearing component, improving the wearing stability of the earphone. The acoustical component and the front positioning structure of the earphone are located on the same side of the datum plane, and the bottom of the cavum conchae of the ear is located on the other side of the datum plane. The size of the acoustical component of the earphone is not limited by the ear, and the larger acoustical component (the acoustic chamber) can be provided to improve the audio experience and the audio performance of the earphone.

What is claimed is:

1. An earphone, adapted to be worn on an ear, the earphone comprising:

a wearing component, comprising a front positioning structure and an acoustic channel, the acoustic channel located in the front positioning structure; and an acoustical component, connected to the wearing component, the acoustical component comprises an acoustic chamber, the acoustic chamber is communicated with the acoustic channel, when the earphone is worn on the ear, the wearing component is located in a cavum conchae of the ear, a surface of a bottom of the earphone adjacent to the cavum conchae is located on a datum plane, the acoustical component and the front positioning structure are located on a first side of the datum plane, the bottom is located on a second side of the datum plane, the first side is opposite to the second side, and the front positioning structure abuts against the ear.

2. The earphone as claimed in claim 1, wherein the wearing component comprises a sound output surface, an acoustic sound output hole of the acoustic channel is located on the sound output surface, and the sound output surface is located on the datum plane.

3. The earphone as claimed in claim 1, wherein the wearing component further comprises a rear positioning structure, when the earphone is worn on the ear, the rear positioning structure is located on the first side of the datum plane and abuts against the cavum conchae.

4. The earphone as claimed in claim 3, wherein the rear positioning structure of the wearing component comprises a rear positioning portion, when the earphone is worn on the ear, the rear positioning portion abuts against the ear.

5. The earphone as claimed in claim 4, wherein the wearing component further comprises a wearing body and a support component connected to each other, the support component comprises a support body, the front positioning structure comprises a front positioning portion, the front positioning portion is located on one side of the support body, two ends of the rear positioning portion are connected to another side of the support body, and a hollow structure is formed between the rear positioning portion and the support body.

6. The earphone as claimed in claim 3, wherein an extension axis of the wearing component is parallel to the datum plane, and the front positioning structure and the rear positioning structure are located on the extension axis.

7. The earphone as claimed in claim 3, wherein the wearing component further comprises a wearing body and a support component connected to each other, a portion of the support component and the wearing body jointly form the front positioning structure, another portion of the support component and the wearing body jointly form the rear positioning structure, the acoustical component is connected to the wearing body, and the acoustic channel is located in the wearing body.

8. The earphone as claimed in claim 1, wherein when the earphone is worn on the ear, an ear canal of the ear is located on the second side of the datum plane.

9. The earphone as claimed in claim 1, wherein when the earphone is worn on the ear, a tragus of the ear covers at least a portion of the front positioning structure.

10. The earphone as claimed in claim 1, wherein the front positioning structure of the wearing component comprises a front positioning portion, the front positioning portion is separated from the acoustic chamber, when the earphone is worn on the ear, the front positioning portion abuts against the ear.

* * * * *